United States Patent [19]
Saijo et al.

[11] Patent Number: 5,004,336
[45] Date of Patent: Apr. 2, 1991

[54] TRANSMISSIVE ORIGINAL PROJECTING APPARATUS

[75] Inventors: Yasutsugu Saijo, Tokyo; Kazuyoshi Chiku; Shigeyoshi Onoda, both of Yokohama, all of Japan

[73] Assignee: Canon Kabushiki Kaisha, Tokyo, Japan

[21] Appl. No.: 404,519

[22] Filed: Sep. 8, 1989

[30] Foreign Application Priority Data

| Sep. 8, 1988 | [JP] | Japan | 63-223568 |
| Sep. 16, 1988 | [JP] | Japan | 63-231935 |
| Sep. 22, 1988 | [JP] | Japan | 63-238195 |
| Dec. 8, 1988 | [JP] | Japan | 63-159013[U] |

[51] Int. Cl.$^5$ .............................................. G03B 21/00
[52] U.S. Cl. ......................................... 353/122; 353/77; 353/79; 353/98
[58] Field of Search ................... 353/119, 72, 73, 79, 353/77, 78, 98, 99, 121, 122, 102, 38; 358/54, 214, 401, 487

[56] References Cited

FOREIGN PATENT DOCUMENTS

| 0191552 | 9/1985 | Japan | 358/214 |
| 0224372 | 11/1985 | Japan | 358/487 |
| 855388 | 11/1960 | United Kingdom | 358/214 |

*Primary Examiner*—Harry N. Haroian
*Attorney, Agent, or Firm*—Fitzpatrick, Cella, Harper & Scinto

[57] ABSTRACT

A transmissive original projecting apparatus has an illuminator for illuminating a transmissive original, a projector for directing light transmitted through the transmissive original to the original supportion portion of an original reading apparatus, and a connecting device for connecting the illuminating illuminator and the projector together.

63 Claims, 17 Drawing Sheets

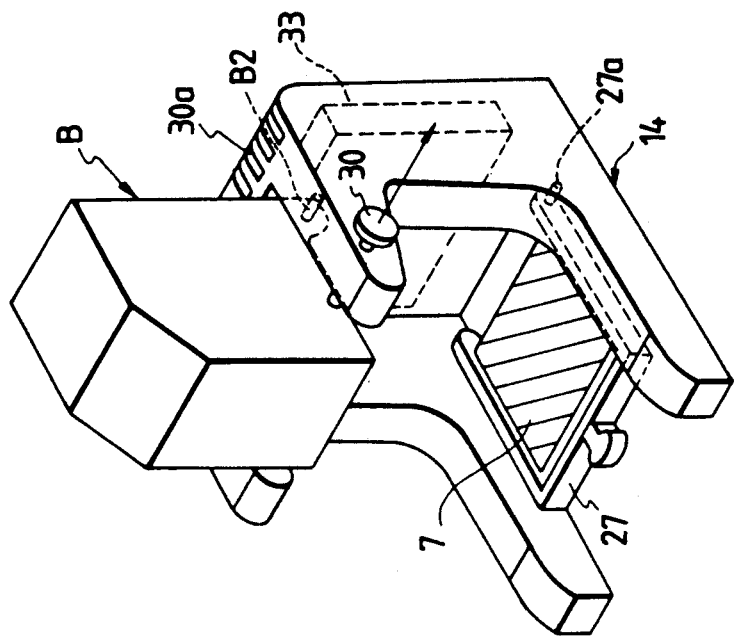
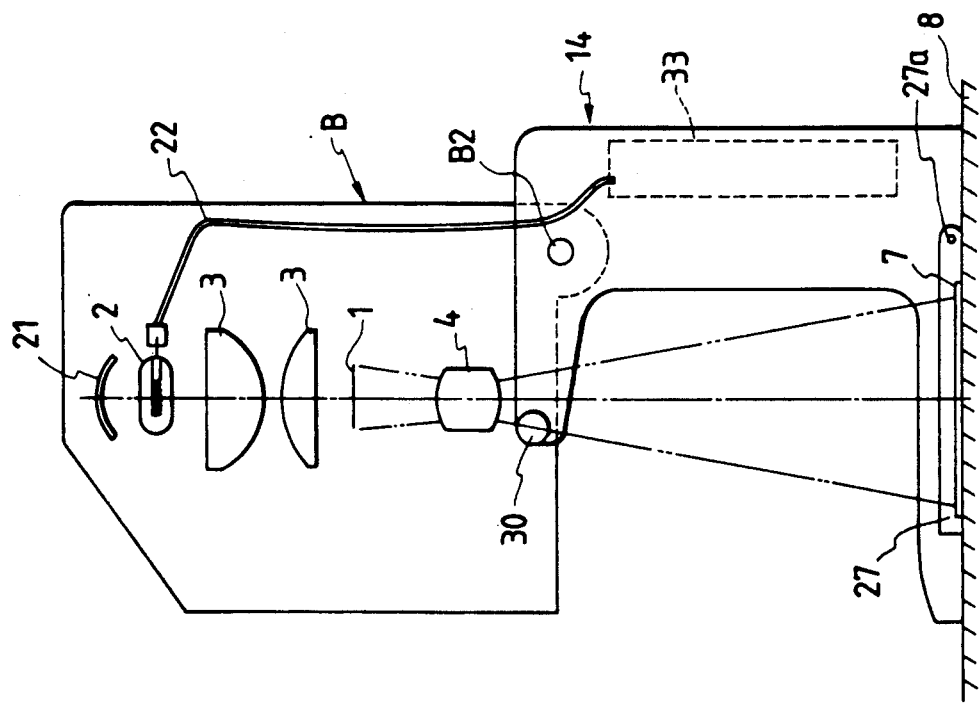

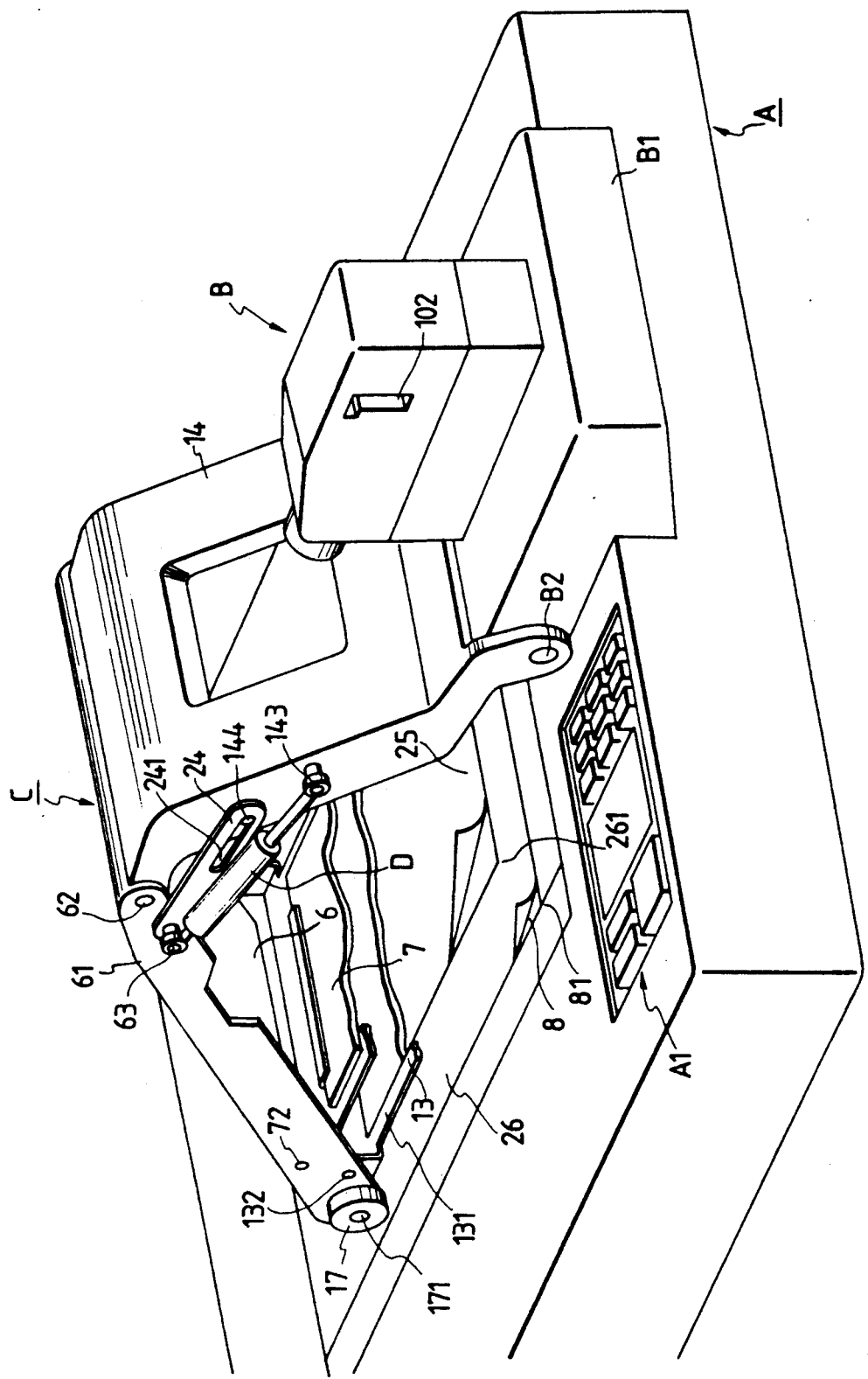

TRANSMISSIVE ORIGINAL PROJECTING APPARATUS

BACKGROUND OF THE INVENTION

1. Field of the Invention

This invention relates to a transmissive original projecting apparatus for projecting the image of a transmissive original such as a slide film or an OHP sheet onto the original supporting portion of an original reading apparatus.

2. Related Background Art

In recent years, with the progress of the tendency of the original reading apparatus and copying apparatus toward multi-function, apparatuses capable of reading transmissive originals such as slide films and 35 mm negative films besides originals placed on the apparatus have begun to spread.

Applicant has previously proposed a novel apparatus in U.S. application Ser. No. 070,193 as an example of such apparatus. This apparatus comprises two units, i.e., an illuminating unit for illuminating a transmissive original and emitting a light beam conforming to the transmissive original, and a projection unit having a reflecting mirror and a Fresnel lens. An example of the apparatus comprising two illuminating and projection units like this is shown in FIG. 21 of the accompanying drawings.

In FIG. 21, the letter A designates an original reading apparatus body, the letter B denotes a projector which is an illuminating unit, and the letter C designates a mirror unit. The projector B and the mirror unit C are removably mountable with respect to the original reading apparatus body.

The reference numeral 1 designates a transmissive original film such as a slide film or a 35 mm negative film, and the reference numeral 2 denotes an illuminating lamp. A light emitted from the illuminating lamp 2 illuminates the original film 1 via a condenser lens 3, and the light 5 transmitted therethrough is applied toward the mirror unit C via a projection lens 4.

Thereafter, the light 5 directed to the original glass side by the reflecting mirror 6 of the mirror unit C passes to a Fresnel lens 7, and the transmitted light image of the original film is formed on the original glass of the original reading apparatus A. Reflecting mirrors 9 and 10 in the original reading apparatus A move and scan to positions 9' and 10', respectively, indicated by broken lines, and during this movement and scanning, the light image is formed on a CCD 12 by a lens 11 and read.

The Fresnel lens 7 is supported by a Fresnel support plate 71. The reflecting mirror 6 is supported by a mirror support member 61 and is rotatable about a shaft 72 relative to the Fresnel support plate 71.

When the transmissive original is not read, that is, when the mirror unit C is not used, the mirror support member 61 is bent as indicated by a dot-and-dash line 61', and the fitting of a positioning pin P which positions the Fresnel support plate 71 is released, whereby the mirror unit C is removed from the original reading apparatus A. Thereafter, the original reading apparatus reads a reflective original such as a document or a drawing placed on the original glass 8.

In such an apparatus, however, it has been necessary to mount and dismount the mirror unit C with respect to the original reading apparatus body each time the reading of a reflective original or a transmissive original is changed over. Further, a separate space for preserving the mirror unit removed from the body has been required and custody of the mirror unit has been cumbersome.

Also, a resin material such as acryl is usually used for the Fresnel lens 7 for the purpose of reducing the cost thereof, but the surface hardness of such lens is as low as the order of HB in terms of pencil hardness and therefore, if the user bumps the mirror unit C against something by mistake when he mounts or dismounts it, the mirror unit is injured, and this had led to the problem that the injury appears in the form of a streak or streaks on the image or a touch with the mirror unit by the hand leaves fingerprints which may result in blurring of the image.

Also, in an original reading apparatus which usually uses a successive reading type image sensor such as a CCD, when the projection light source 2 of a film projection device is driven by AC, the light source is turned on and off at 50 to 60 Hz and therefore, data read while the light source is turned off assumes a state of blank area which appears in the form of a white or black line during the outputting of the image, and this necessitates a power source for making an AC power source into a DC power source.

However, the transformer and power transistor in such power source becomes as hot as about 100° C. during the operation thereof, and the exhaust heat thereof poses a great problem in mechanical construction. At the same time, a halogen lamp usually of the order of 250 W becomes necessary as the projection light source 2 even in a case where a 35 mm film is enlarged to the order of A6 size, and exhaust of a great deal of heat produced with light also poses an important problem.

However, in the aforedescribed apparatus, the power source for making an AC power source into a DC power source is disposed in the projector B containing the projection light source 2 therein, and therefore, the heat by the two heat generating sources concentrates, and this has led to the disadvantage that depending on conditions, thermal deformation of the cover portion of the projector is caused or a large heat exhaust fan mounted to avoid it results in the bulkiness and increased cost of the apparatus.

SUMMARY OF THE INVENTION

It is an object of the present invention to provide a transmissive original projecting apparatus in which an illuminating unit and a mirror unit are connected together and are further made movable relative to each other, whereby the apparatus body can be contained compactly.

It is another object of the present invention to provide a transmissive original projecting apparatus in which the temperature rise of an illuminating unit is minimized.

It is still another object of the present invention to provide a transmissive original projecting apparatus which can be readily disposed or retracted on the original supporting portion of an original reading apparatus.

Further objects of the present invention will become apparent from the following detailed description.

BRIEF DESCRIPTION OF THE DRAWINGS

FIG. 6 is a cross-sectional view showing a third embodiment of the present invention.

FIG. 7 is a perspective view of the third embodiment.

FIG. 14 shows a case where a transmissive original placed on the apparatus of FIG. 9 is read.

DESCRIPTION OF THE PREFERRED EMBODIMENTS

Figure 1:
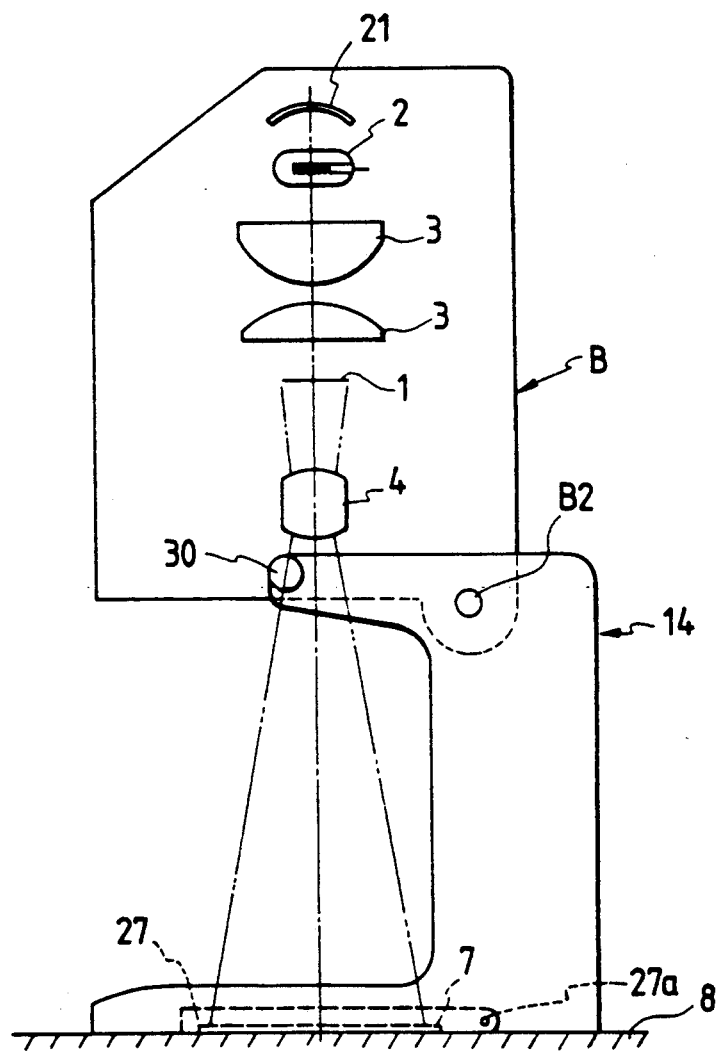
FIGS. 1 and 2 are cross-sectional views showing a first embodiment of the present invention.

Some embodiments of the present invention will hereinafter be described with reference to the drawings throughout which functionally similar members are given similar reference numerals.

Figure 2:
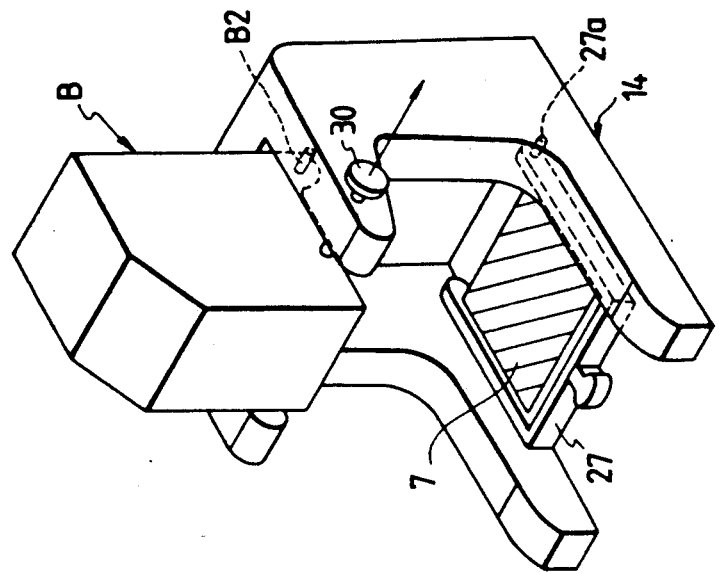
Figure 3:
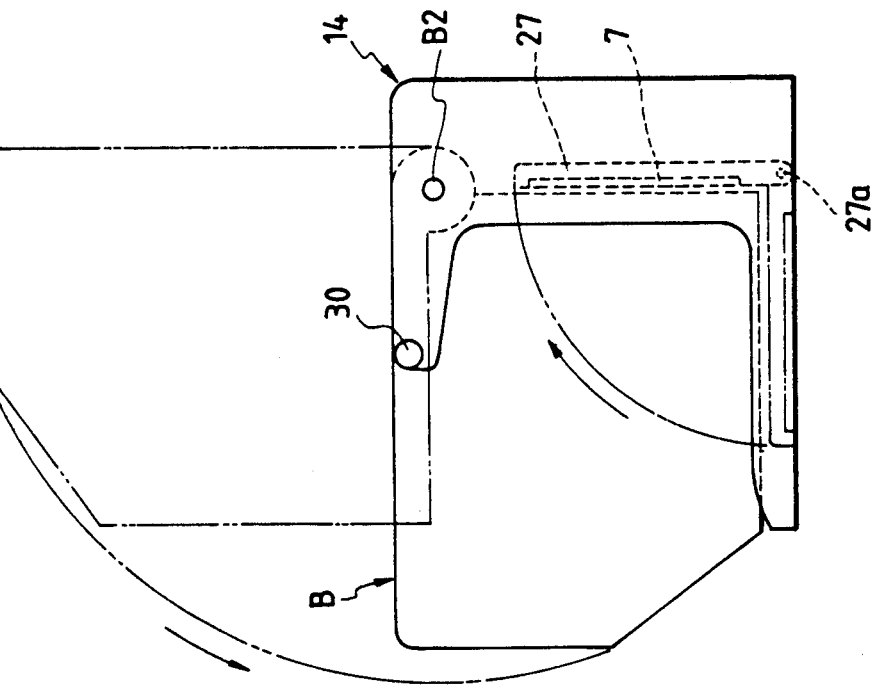
FIG. 3 is a perspective view of the first embodiment.

FIGS. 1 to 3 show a transmissive original projecting apparatus according to a first embodiment of the present invention.

In FIG. 1, light emitted from a projection light source 2 illuminates a film 1 through a condensing lens 3 with the light reflected by a reflecting mirror 21, and the film illuminating light may be projected by a projection lens 4 and projected onto the original table glass 8 of an image reading apparatus through a Fresnel lens 7 disposed on the upper surface of the original table glass 8.

A film illuminating unit comprising the reflecting mirror 21, the projection light source 2 and the condensing lens 3, a film setting unit (not shown) for holding the film 1, and a projection optical system unit comprising the projection lens 4 are integrally formed as an upper body portion B, which is pivotably supported on a U-shaped lower pedestal portion 14 by means of a rotational shaft B2 and is adapted to be fixed in a projecting position by a lock shaft 30. The Fresnel lens 7 is supported by a support arm 27 as a support member, and one end of the support arm 27 is pivotably mounted on the lower pedestal portion 14 by means of a rotational shaft 27a. That is, the lower pedestal portion 14 serves as a connecting member which connects the upper body portion B to the support arm 27 for supporting the Fresnel lens 7.

In the present embodiment of the above-described construction, to bring the transmissive original projecting apparatus from the use position shown in FIGS. 1 and 3 to the non-use position, as shown in FIG. 2, the support arm 27 for the Fresnel lens 7 is first pivotally moved by 90° in a clockwise direction to assume an upright position, whereafter the lock shaft 30 is pulled back to thereby rotate the upper body portion B by 90° in a counter-clockwise direction about the rotational shaft B2. Thereupon, the upper body portion B becomes contained in the lower pedestal portion 14 which is on the optical path side of the light beam emitted from the body portion. In this state, the Fresnel lens 7 is nipped between the wall surface of the lower pedestal portion 14 and the underside of the upper body portion B and the front and back surfaces of the Fresnel lens 7 are covered. Accordingly, the Fresnel lens 7 can be protected without being touched by the hand or being bumped, and thus a good projected image can be obtained during the projection of a transmissive original.

When the upper body portion B which is the illuminating unit is to be contained in the lower pedestal portion 14, the height 400 mm of the apparatus, for example, during the enlargement projection of A6 size can be reduced to one half.

In the present embodiment, the user rotatively operates the upper body portion B and the support arm 27 discretely from each other, but the rotation of the upper body portion B and the rotation of the support arm 27 may be connected for operative association by a link mechanism, whereby the apparatus becomes easier to use for the operator.

Also, if at this time, movement of the upper body portion B is inhibited until the movement of the support arm 27 is terminated, the contact between the upper body portion B and the support arm 27 can be avoided to thereby ensure the apparatus to be contained more safely.

Figure 4:
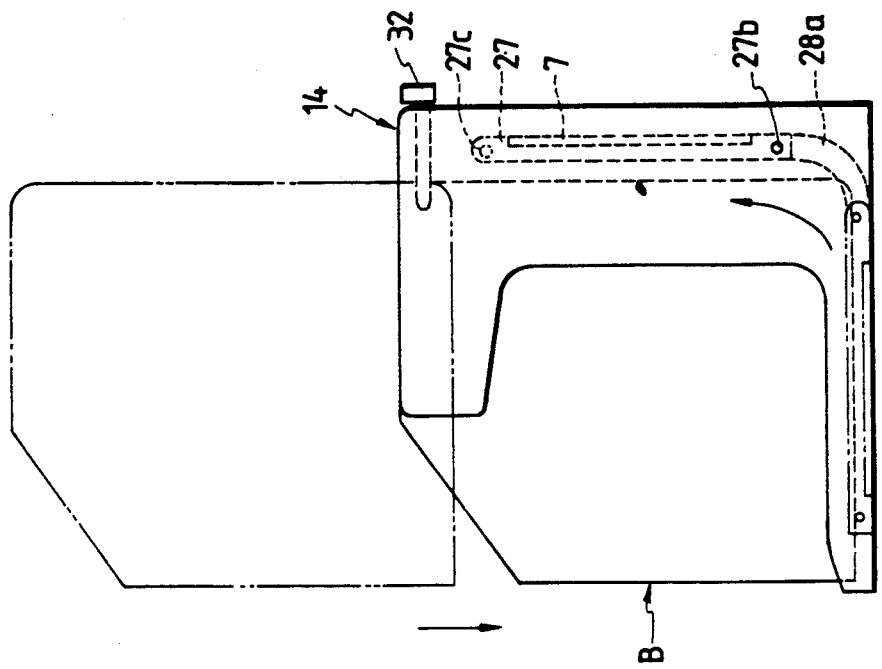
FIGS. 4 and 5 are cross-sectional views showing a second embodiment of the present invention.
Figure 5:
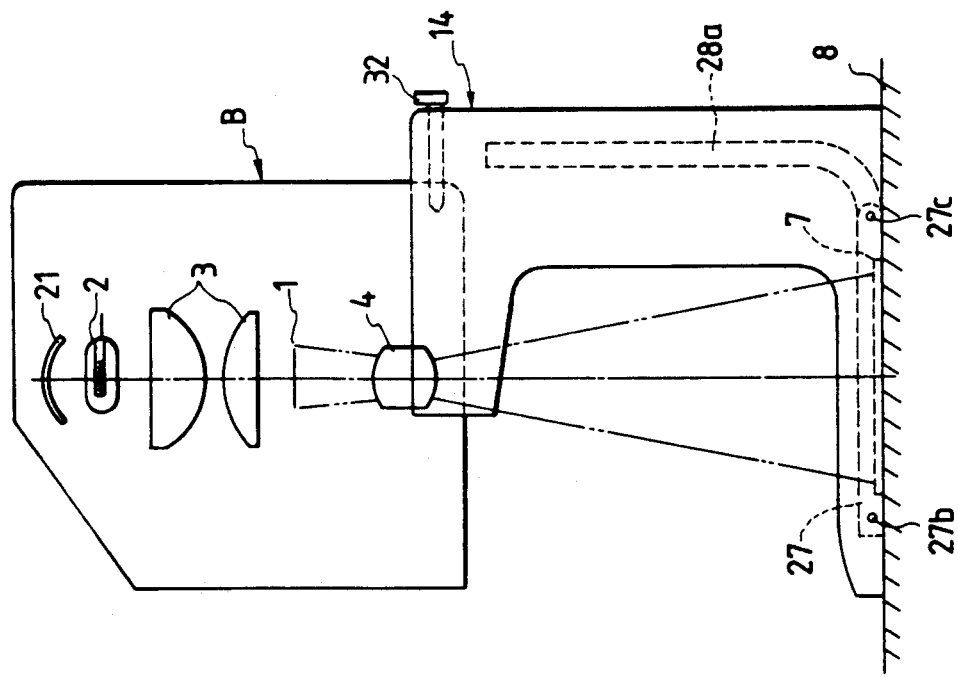

In FIGS. 4 and 5 which show a second embodiment of the present invention, the upper body portion B is vertically slidably mounted on a U-shaped lower pedestal portion 14 and is fixed by a fixing pin 32. A support arm 27 supporting the Fresnel lens 7 has shaft 27b and 27c at the opposite ends thereof engaged with an L-shaped groove 28a formed in the lower pedestal portion 14 and is slidably mounted. In the other points, the construction of the present embodiment is similar to that of the previous embodiment.

In the present embodiment of the above-described construction, to bring the transmissive original projecting apparatus from the use position shown in FIG. 4 to the non-use position shown in FIG. 5, the support arm 27 slides in the direction of arrow along the groove 28a formed in the lower pedestal portion 14, i.e., rightwardly obliquely upwardly. Thereafter, the fixing pin 32 is pulled rightwardly as viewed in FIG. 5 to release the fixing, whereafter the upper body portion B is downwardly slid and contained in the lower pedestal portion 14. At that time, the Fresnel lens 7 is nipped between the wall surface of the lower pedestal portion 14 and the wall surface of the upper body portion B and protected thereby, and a good projected image can be obtained during projection.

A third embodiment of the present invention will now be described with reference to FIGS. 6 and 7.

FIGS. 6 and 7 show a transmissive original projecting apparatus carried on an original reading apparatus for reading by an image sensor such as CCD. A power source 33 for making an alternating current to a direct current and driving the projection light source 2 of the upper body portion B is disposed on the rear side of the lower pedestal portion 14, and supplies electric power to the projection light source 2 through a cord 22 for the light source. This power source 33 has a transformer and a power transistor for making an AC power source into a DC power source, and has a weight of several hundred grams. A heat exhaust louver 30a for cooling the power source 33 is formed on the rear upper portion of the lower pedestal portion 14. In the other points, the construction of the present embodiment is similar to that of the previous embodiment.

In the present embodiment of the above-described construction, two heat generating sources, i.e., the projection light source 2 and the power source 33 for driving the projection light source are separated from each other and therefore, the temperature rise of the illuminating unit can be minimized and numerous and large fans for heat exhaust become unnecessary and thus, the apparatus can be made compact and the power source unit can be provided in the lower portion and the position of the center of gravity can be lowered to thereby stabilize the apparatus.

Figure 8:
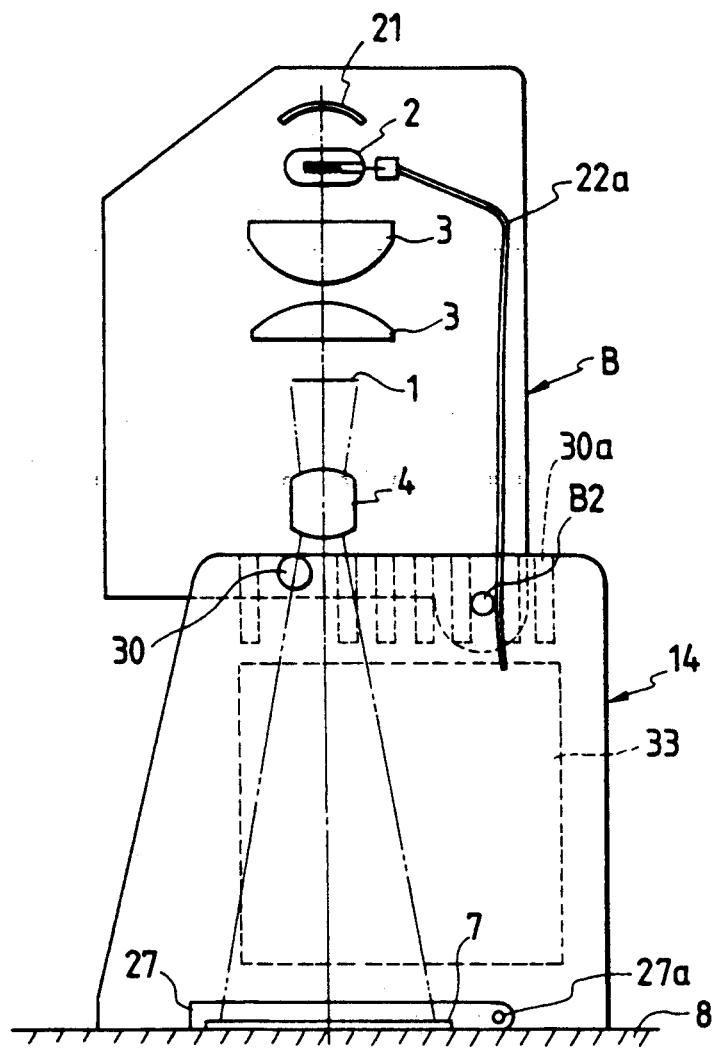
FIG. 8 is a cross-sectional view showing a fourth embodiment of the present invention.

FIG. 8 shows a fourth embodiment of the present invention.

In the present embodiment, the opposite side wall portions of the lower pedestal portion 14 are formed widely, and a DC-making power source 33 for driving the projection light source 2 of the upper body portion B is disposed in one of the side wall portions, and a heat exhaust louver 30a for the DC-making power source 33 is formed on the upper portion thereof. In the other points, the construction of the present embodiment is entirely similar to that of the previous embodiment.

Thus, as in the previous embodiment, the light source and the power source are separated from each other and therefore, the temperature rise of the illuminating unit can be minimized and the apparatus can be made compact and stable. The DC-making power source 33 is not restricted to the dispositions in the aforedescribed embodiments, but may be disposed anywhere in the lower pedestal portion 14, and the DC-making power source 33 may be divided into a plurality of units and disposed.

As described above, the present embodiment has a connecting member for connecting the illuminating unit and the projecting unit together, by containing the apparatus with the illuminating unit moved, the apparatus can be made very compact during non-use and can be simply returned to its used state.

Description will now be made of another embodiment of the present invention in which the illuminating unit and the projecting unit are connected together.

A fifth embodiment of the present invention will hereinafter be described with reference to FIGS. 9, 10 and 11.

Figure 9:
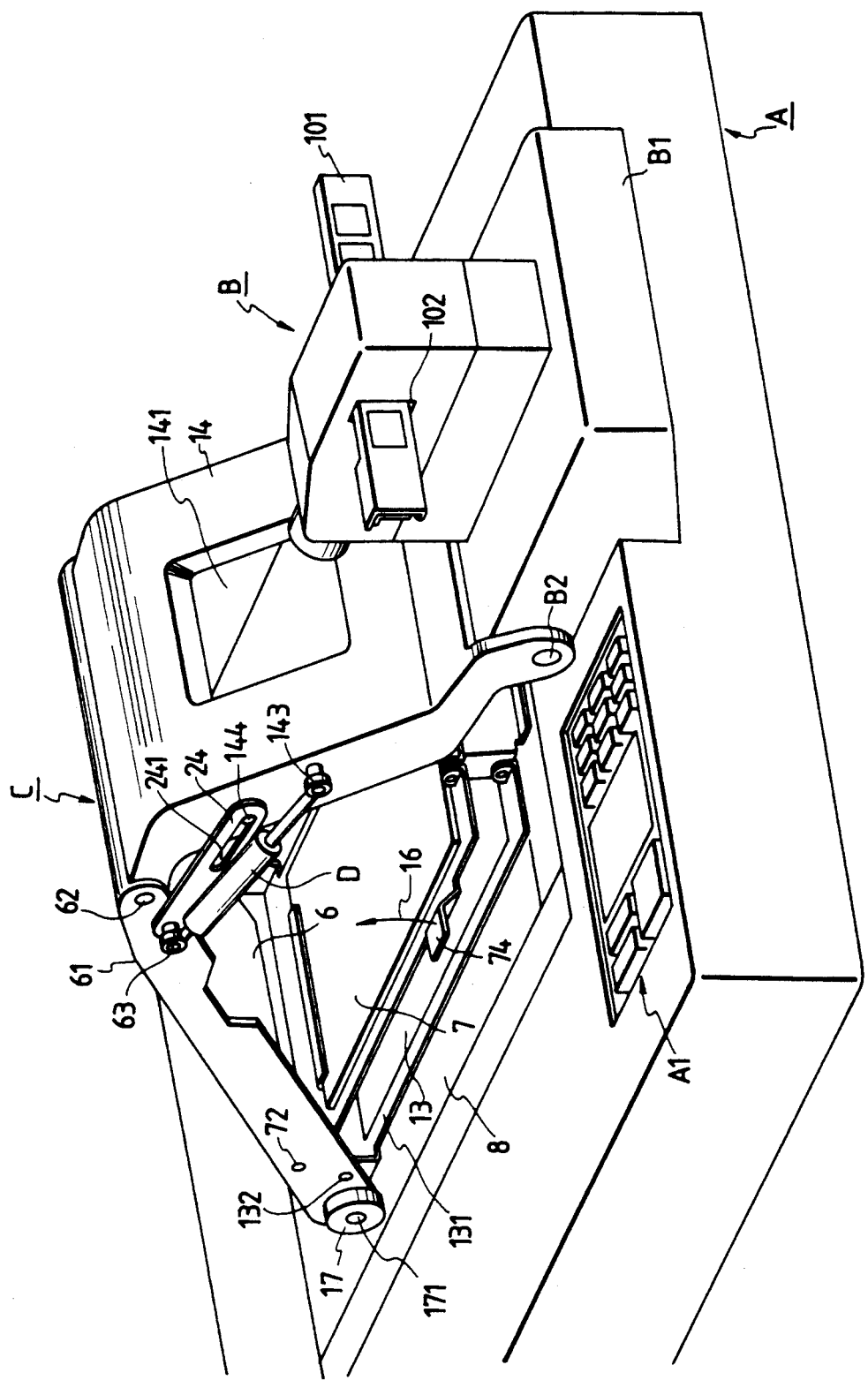
FIG. 9 is a perspective view showing a fifth embodiment of the present invention.
Figure 10:
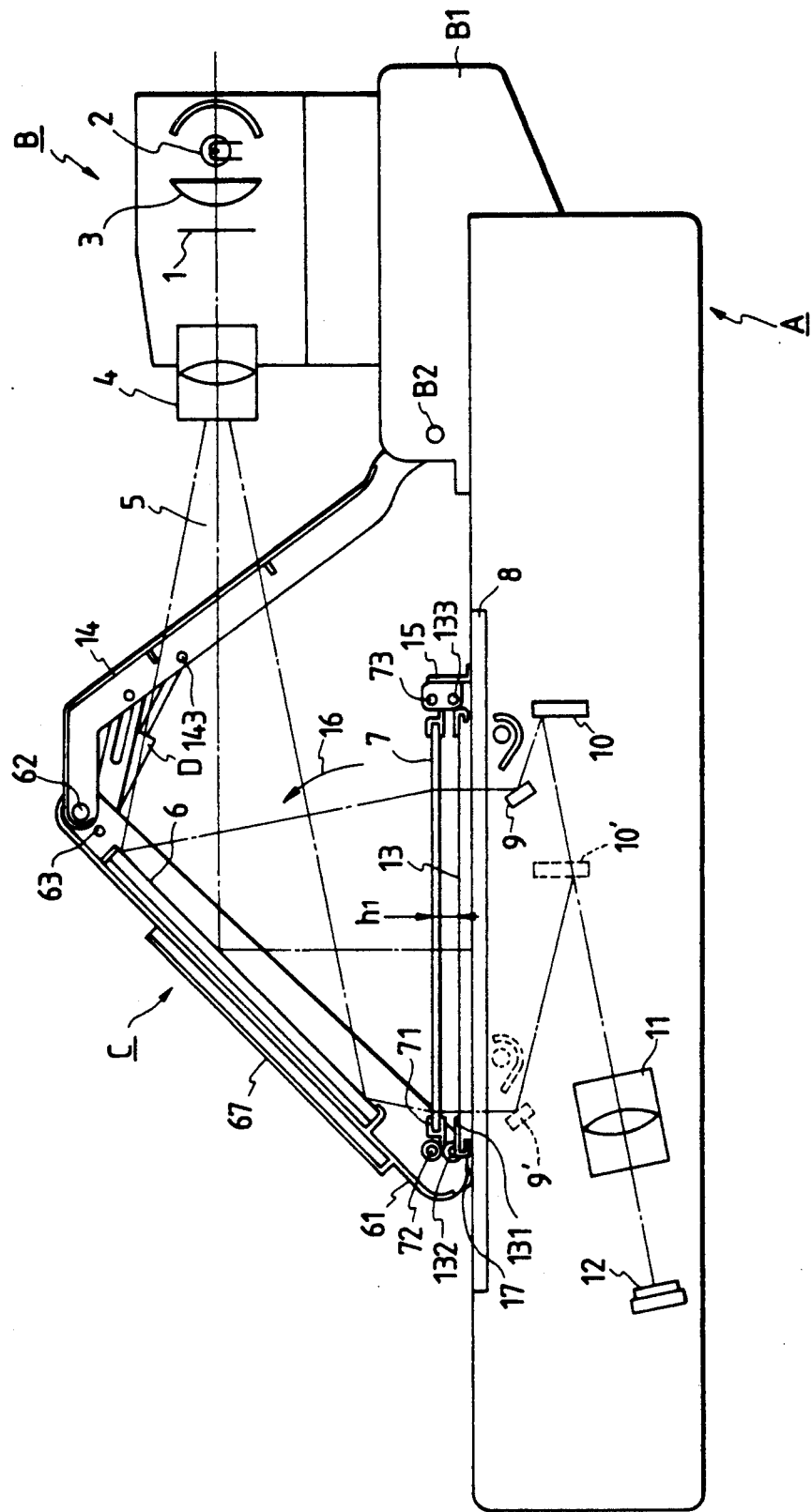
FIGS. 10 and 11 are cross-sectional views showing the fifth embodiment.
Figure 11:
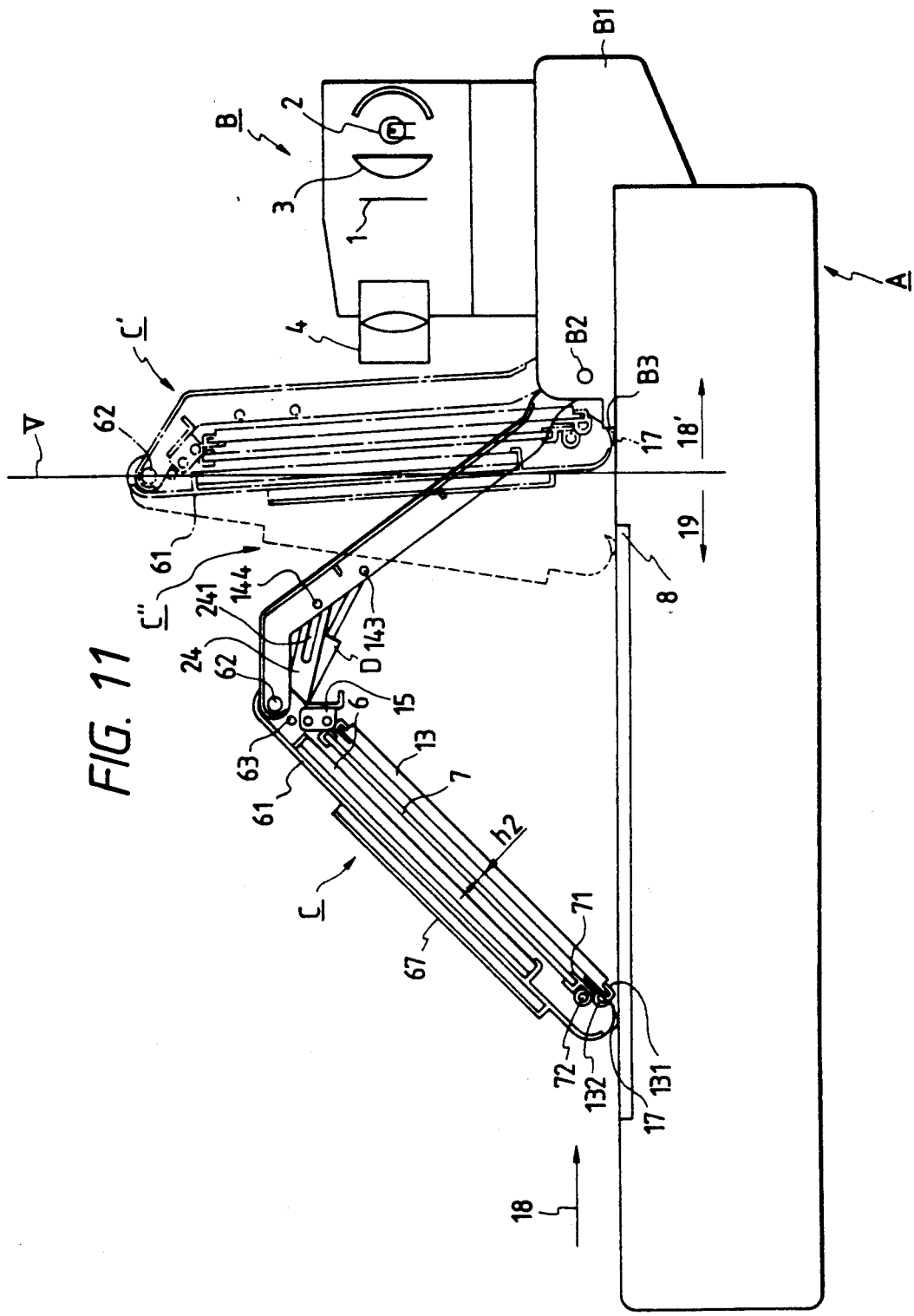

FIGS. 9 and 10 shows the transmissive original projecting apparatus as it is used, and FIG. 11 shows the apparatus as it is contained.

The used state shown in FIGS. 9 and 10 will first be described.

The bed B1 of a projector B and a mirror support member 61 supporting a reflecting mirror 6 are connected together by a connecting plate 14 having an opening 141 for passing a projected light beam therethrough. That is, the connecting plate forms an optical path along which the projected light beam passes. The connecting plate 14 and the bed B1 are rotatably connected together by a shaft B2. Also, the connecting plate 14 and the mirror support member 61 are rotatably connected together by a shaft 62. A Fresnel lens 7 which is a parallel light projection lens for making the projected light beam deflected by the reflecting mirror into a substantially parallel light is supported above the original glass 8.

The Fresnel lens 7 is supported by a Fresnel support plate 71, and one end of the Fresnel support plate 71 is rotatably supported on the mirror support member 61 by a shaft 72 and the other end of the Fresnel support plate 71 is rotatably supported on a link plate 15 by a shaft 73 provided on the link plate 15. The opening in the connecting plate is smaller than the light receiving area of the reflecting mirror and cuts the lights other than the projected light beam.

By this construction, the Fresnel lens 7 can be moved close to the reflecting mirror 6, and the Fresnel lens 7 and the reflecting mirror 6 thus brought close to each other can be moved by the connecting plate 14 to a position retracted from the original glass 8 of the projector B.

A roller 17 having a suitable degree of frictional force relative to the original glass is mounted on the end portion of the mirror support member which is adjacent to the original supporting portion for rotation relative to a shaft 171. (In FIG. 9, the inner side is also similar.) That is, in a state in which the Fresnel lens indicated by solid line in FIG. 11 is contained, the mirror unit C is pushed in the direction of arrow 18, whereby the roller 17 rolls on the original glass 8 and the apparatus is folded to a position C' (a position indicated by dot-and-dash line in FIG. 11) in which the roller 17 strikes against a stopper 133, and is thus contained.

Due to this rotation of the roller, the mirror unit C does not slip on the original glass and contamination, injury or the like of the original glass does not occur during the movement of the mirror unit.

Also, when the mirror unit C is in the contained state C' indicated by dot-and-dash line in FIG. 11, the roller 17 is on the projector side with respect to a perpendicular V passing through a shaft 62.

With this construction, the mirror unit C is acted on so as to be biased toward the projector side by a moment of rotation produced about a shaft B2 by the gravity of the mirror unit C. Therefore, in the contained state C' of the mirror unit, the mirror unit can be contained without the use of a latch or a lock.

Description will now be made of a case where the mirror unit is moved from the contained position to the use position.

If the user releases his hand when the mirror unit is moved from the state indicated by dot-and-dash line in FIG. 11 to the original supporting portion side and the roller 17 is positioned at the left side from the perpendicular V (for example, the broken line C" in FIG. 11), the mirror unit may be abruptly moved to the position of solid line in FIG. 11 by the action of gravity to thereby apply a great shock to the shaft 62, the shaft B2, the mirror support member 61, etc. and injure them. In the present embodiment, this problem is also solved.

The present embodiment has a damper D having its opposite end pivotably supported by the shaft 63 of the mirror support member 61 and the shaft 143 of the connecting plate 14, respectively.

What is suitable as this damper will now be described with reference to the cross-sectional views of FIGS. 12A and 12B.

Figure 12A:
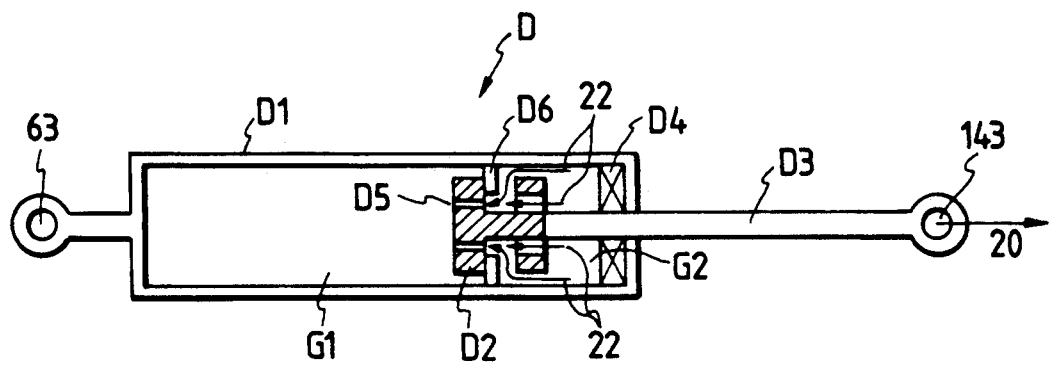
FIGS. 12A and 12B are cross-sectional views of a damper used in the apparatus of FIG. 9.
Figure 12B:
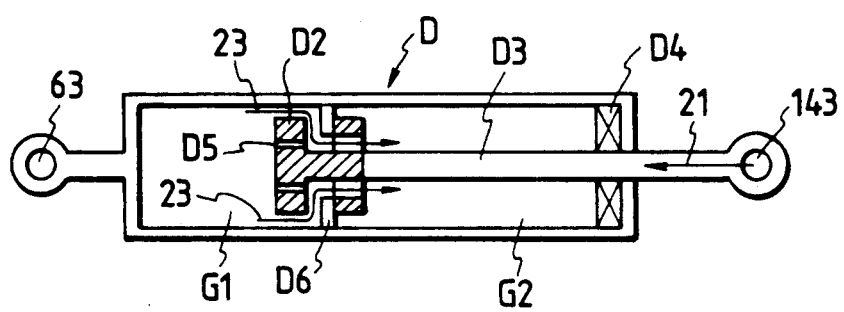

FIG. 12A shows state in which the shaft 143 is moved and stretched in the direction of arrow 20 relative to the shaft 63 (that is, the mirror unit is moved from the contained position to the use position), and FIG. 12B shows a state in which the shaft 143 is moved and compressed in the direction of arrow 21 relative to the shaft 63 (that is, the mirror unit is moved from the use position to the contained position).

A piston D2 in a cylinder D1 is fixed to a piston rod D3 which protrudes out of the cylinder D1 through a seal D4. The piston D2 is formed with a minute orifice D5 in which a valve D6 is disposed. Gas is enclosed in spaces G1 and G2 in the cylinder D1 divided by the piston D2.

When the shaft 143 is stretched, in FIG. 12A, the gas in the space G2 flows as indicated by arrow 22, but flows into the space G1 through the orifice D5 and therefore, there is provided a damper effect by the resistance when the gas passes through the orifice D5. On the other hand, when the shaft 143 is compressed, in FIG. 12B, the position of the valve D6 changes from that in FIG. 12A and therefore, the gas in the space G1 passes through the interior of the piston D2 and moves into the space G2 without the intermediary of the orifice D5 as indicated by arrow 23. Therefore, there is little or no damper effect.

In the present embodiment, the damper D as described above is used in the position shown in FIG. 9 and in the opposed position (not shown).

In FIG. 11, when the hand is released in the position indicated by broken line C", the roller 17 rolls in the direction of arrow 19. At that time, the damper D is stretched and therefore, there is provided a damper effect.

An arm 24 is supported for rotation relative to the shaft 63 and for sliding movement relative to the shaft 144 of the connecting plate 14. Another arm 24 is provided at the opposed position (not shown).

When the roller 17 rolls in the direction of arrow 19, the mirror support member 61 moves relatively slowly to the left due to the damper effect of the damper D and stops moving at a position whereat a slot 241 in the arm 24 strikes against a shaft 144. Adjustment is made such that at this position, the mirror 6 assumes a predetermined angle. That is, the arm 24 is a positioning member for determining the position of the mirror 6.

As described above, by the use of the damper D, a vehement shock can be prevented from being applied to the shaft 62, the shaft B2, the shaft 144, the mirror support member 61, etc. Also, the irregularity of the angle of the mirror 6 when the mirror support member 61 is opened becomes small (according to the experiment, the repetition angle irregularity of the mirror 6 was of the order of several minutes to several tens of minutes). Conversely, when the mirror support plate 61 is returned to the contained position C', the damper is compressed and therefore, the damper does not work and the mirror unit can be smoothly contained without resistance.

In the present embodiment, two dampers D are used on this side and the inner side, respectively, but alternatively, a damper D may be used on only one of this side and the inner side to provide a damper effect.

Figure 13:
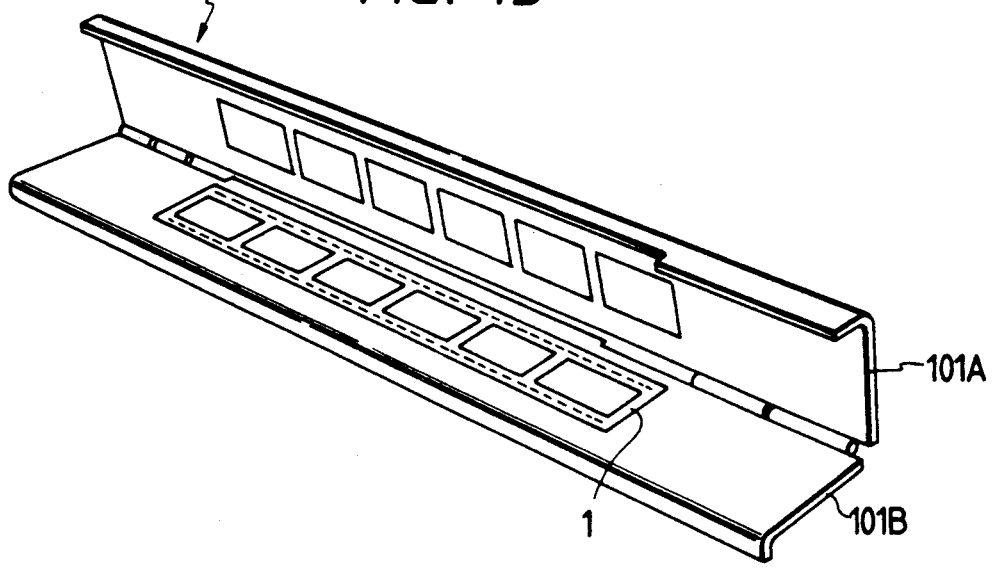
FIG. 13 is a perspective view of a film carrier used in the apparatus of FIG. 9.

FIG. 13 is a perspective view of a film carrier 101 in FIG. 9.

When in the transmissive original illuminating apparatus of the present embodiment, a 35 mm film, a slide film or the like is to be projected, an original film 1 is first interposed between the two plates 101A and 101B of the film carrier 101, as shown in FIG. 13. This film carrier 101 is then inserted into a carrier hole 102 in the projector B as shown in FIG. 9, and a desired frame of the film is disposed on the optical axis. Thereafter, a predetermined input is done from the operating panel A1 of the original reading apparatus A, whereby the image reading operation is performed.

Also, in the present embodiment, the Fresnel lens 7 is not brought into close contact with the original glass 8 but is disposed above the original glass with a space kept therebetween. The reason is that generally the Fresnel lens 7 is of a structure having concentric or parallel minute grooves on the surface thereof and close contact of the Fresnel lens 7 with the original glass would cause the minute grooves to disturb the read image and adversely affect the image. As a method of preventing this, it is conceivable to make one surface of the Fresnel lens 7 into a mat-like diffused surface, but it would result in an increase in the quantity of transmitted light.

For this reason, the Fresnel lens 7 is supported above the original glass 8 so that the grooves of the Fresnel lens 7 are positioned outside the focus range of the lens 11 of the original reading apparatus A.

In the present embodiment, besides 35 mm films and slide films of small format, films of large formats such as 8 inches × 10 inches and 4 inches × 5 inches or films for OHP can be illuminated and read as originals.

FIG. 14 is a perspective view illustrating a case where a film of relatively large format as described above is illuminated. In FIG. 14, an original supporting reference 81 provided on the original glass 8 is the reference when an original is supported when an ordinary reflective original (such as a document or a drawing) is to be read.

Figure 15A:
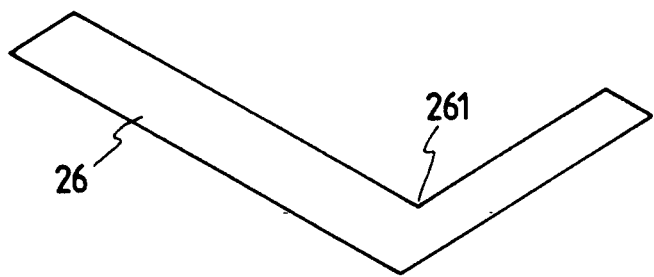
FIGS. 15A and 15B show a transmissive original reference sheet applied to the apparatus of FIG. 9.
Figure 15B:
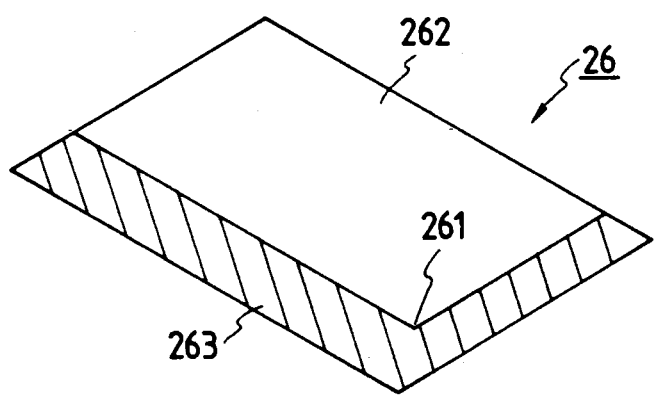

When an original film 25 is to be read by the image reading apparatus A, a transmissive original reference sheet 26 is first positioned and placed relative to the original supporting reference 81, whereafter the original film 25 is positioned relative to a supporting reference 261 for the transmissive original reference sheet 26. The transmissive original reference sheet 26 may be, for example, an L-shaped sheet shown in FIG. 15A or a sheet indicating the supporting reference 261 by a transparent portion 262 and a colored portion 263 as shown in FIG. 15B.

Figure 16A:
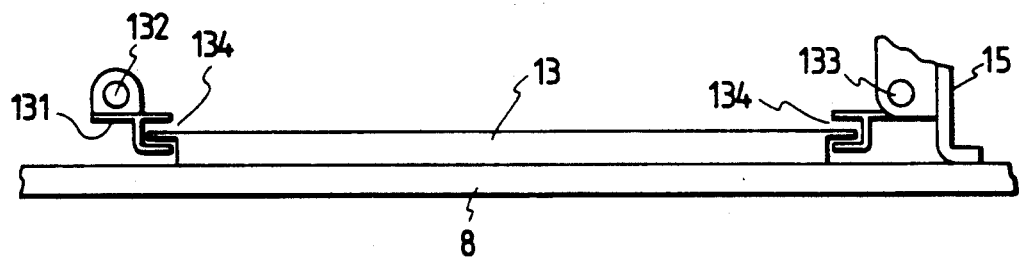
FIGS. 16A and 16B show an original keep plate provided in the apparatus of FIG. 9.
Figure 16B:
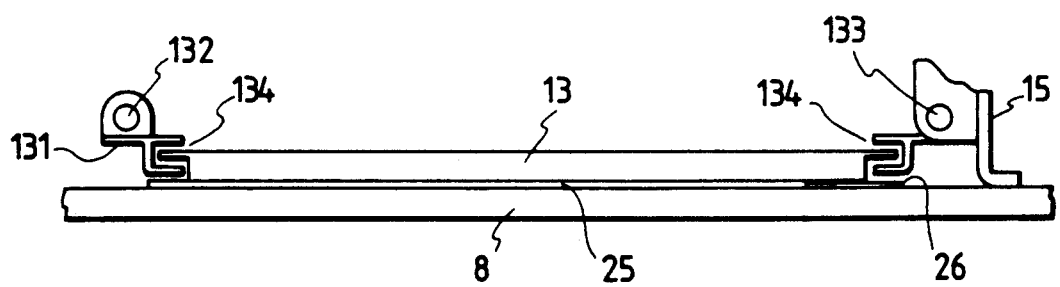

FIGS. 16A and 16B are side cross-sectional views of the vicinity of the original keep plate 13 for pressing the original glass 8. FIGS. 16A shows a case where the original film 25 is absent, and FIG. 16B shows a case where the original film 25 is placed relative to the transmissive original reference sheet 26.

The original keep plate 13 is supported with back-lash 134 relative to a keep plate supporting plate 131 for supporting the original keep plate. Therefore, in the case of FIG. 16A, the original keep plate 13 is placed in close contact with the original glass 8, while in the case of FIG. 16B, the amount corresponding to the thickness of the original film 25 is absorbed by the back-lash 134 of the original keep plate 13 and the original film 25 is urged against the original glass 8 by the gravity of the original keep plate 13, and by the original keep plate 13 being used in this manner, the original film is placed on the original glass 8 in close contact therewith without slack or waving being caused in the surface of the original film.

Figure 17A:
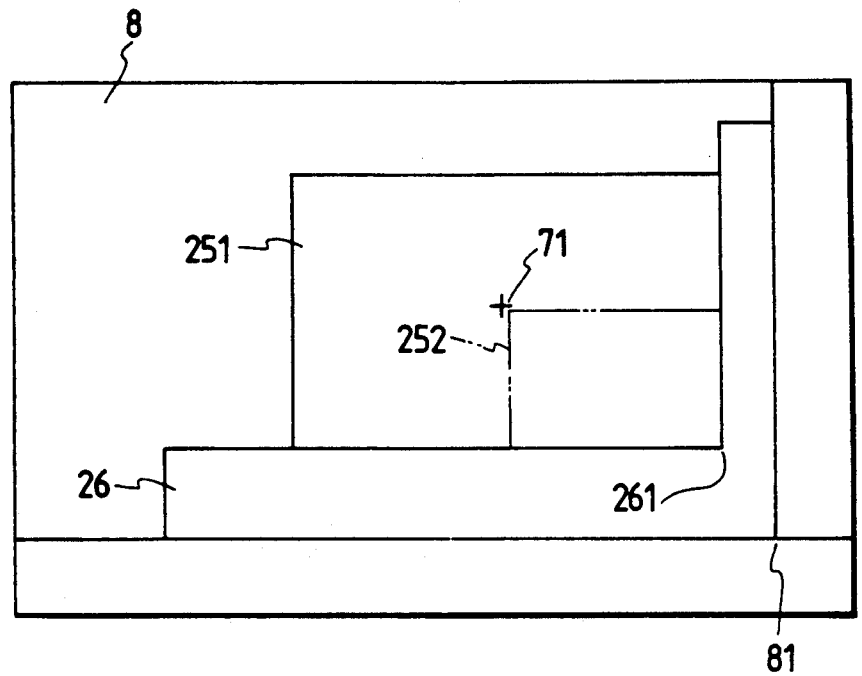
FIGS. 17A and 17B show a transmissive original as it is placed on the original glass of the apparatus of FIG. 9.
Figure 17B:
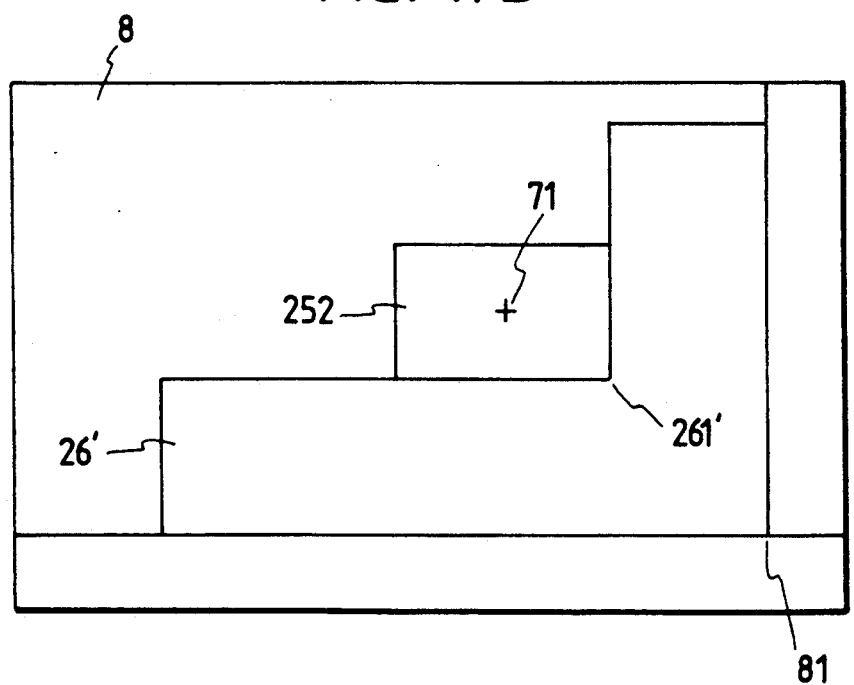

FIGS. 17A and 17B are plan views of original films as they are placed on the original glass 8. FIG. 17A shows a case where a photographic film of large format such as 8 inches×10 inches or a large film such as a film for OHP is used as an original film 251. FIG. 17B shows a case where a relatively small film such as a photographic film of 4 inches×5 inches is placed as an original film 252.

In FIG. 17A, when use is made of the transmissive original reference sheet 26 applied to the large original film 251, the large original film 251 is disposed so that the center (the cross 71) of the Fresnel lens 7 is substantially the center of the original film 251. When in this state, the small original film 252 (indicated by dot-and-dash line) is positioned and placed relative to the reference 261 of the transmissive original reference sheet 26, the center 71 of the Fresnel lens is at a position far from the center of the small original film 252. Thus, the distribution of quantity of light is non-uniform at the position far from the center 71 of the Fresnel lens and the adverse effect thereof is liable to present itself.

So, as shown in FIG. 17B, a second transmissive original reference sheet 26' suitable for the small original film 252 is used and disposed so that the center 71 of the Fresnel lens lies substantially near the central portion of the original film 252, whereby said adverse effect can be eliminated.

The previously described original keep plate 13 is disposed between the Fresnel lens 7 and the original glass 8, and the state of the original keep plate 13 when the apparatus is contained will be described hereinafter.

This original keep plate 13 is a transparent plate-like member and is supported by the keep plate supporting plate 131, and as shown in FIG. 10, this keep plate supporting plate 131, like the Fresnel supporting plate 71, has one end thereof rotatably supported on the mirror support member 61 by the shaft 132 and has the other end thereof rotatably supported on the link plate 15 by the shaft 133 provided on the link plate 15.

Thus, the mirror support member 61, the Fresnel supporting plate 71, the keep plate supporting plate 131 and the link plate 15 together constitute a parallel link mechanism. At this time, the Fresnel lens 7 and the original keep plate 13 are substantially parallel to each other.

By a handle 74 shown in FIG. 9 being raised in the direction of arrow 16 by this link mechanism, the Fresnel lens 7 and the original keep plate 131 can be moved to their contained positions in the mirror support member 61, as indicated by solid lines in FIG. 11.

By this parallel link mechanism, the spacing $h_2$ (FIG. 11) between the Fresnel lens 7 and the keep plate 13 in the contained state can be made smaller than the spacing $h_1$ (FIG. 10) between the Fresnel lens 7 and the keep plate 13 in the used state and thus, the apparatus having the original keep plate can be contained more compactly.

Figure 18:
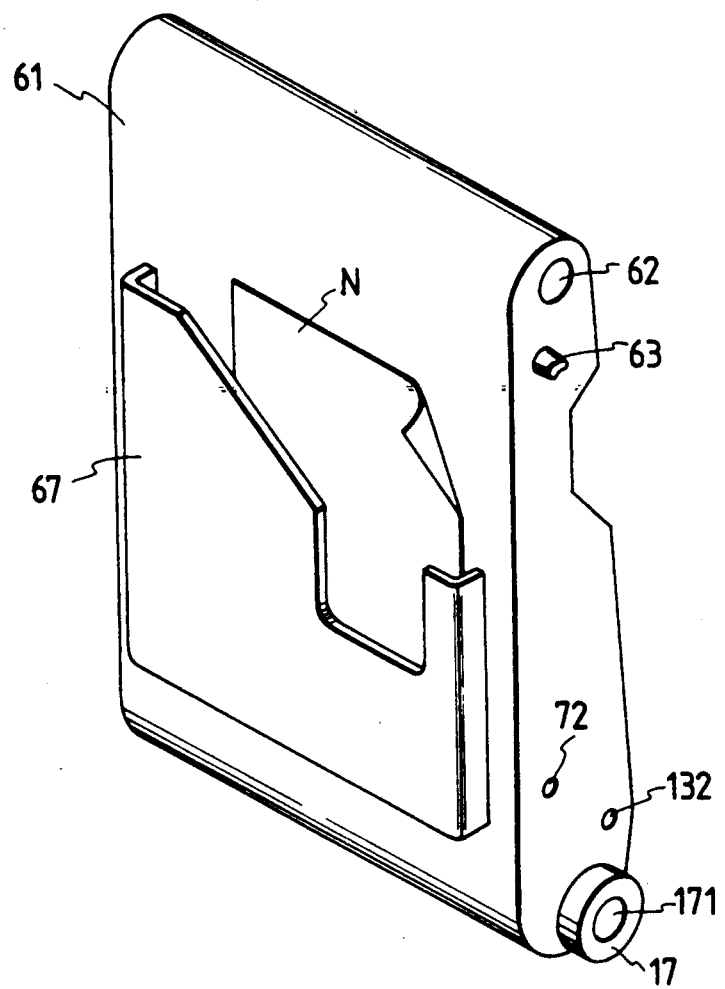
FIG. 18 is a perspective view showing a mirror support member provided in the apparatus of FIG. 9.

FIG. 18 is a perspective view of the mirror support member 61. The mirror support member 61 is provided with a sheet pocket 67 in which a sheet N such as an original film or a transmissive original reference sheet can be contained. Thus, various sheets necessary for the transmissive original illuminating apparatus, such as original films and transmissive original reference sheets, can be prevented from being scattered and lost and can be easily contained.

A sixth embodiment of the present invention will now be described with reference to FIGS. 19 and 20.

The Fresnel lens 7 and the original keep plate 13 are fixed to a first connecting member 14a, and the mirror support member 61 is supported for rotation relative to the first connecting member 14a by a shaft 72'. A second connecting member 14b is connected for rotation relative to the first connecting member 14a by a shaft 62' and is connected for rotation relative to the bed B1 by a shaft B2.

Figure 19:
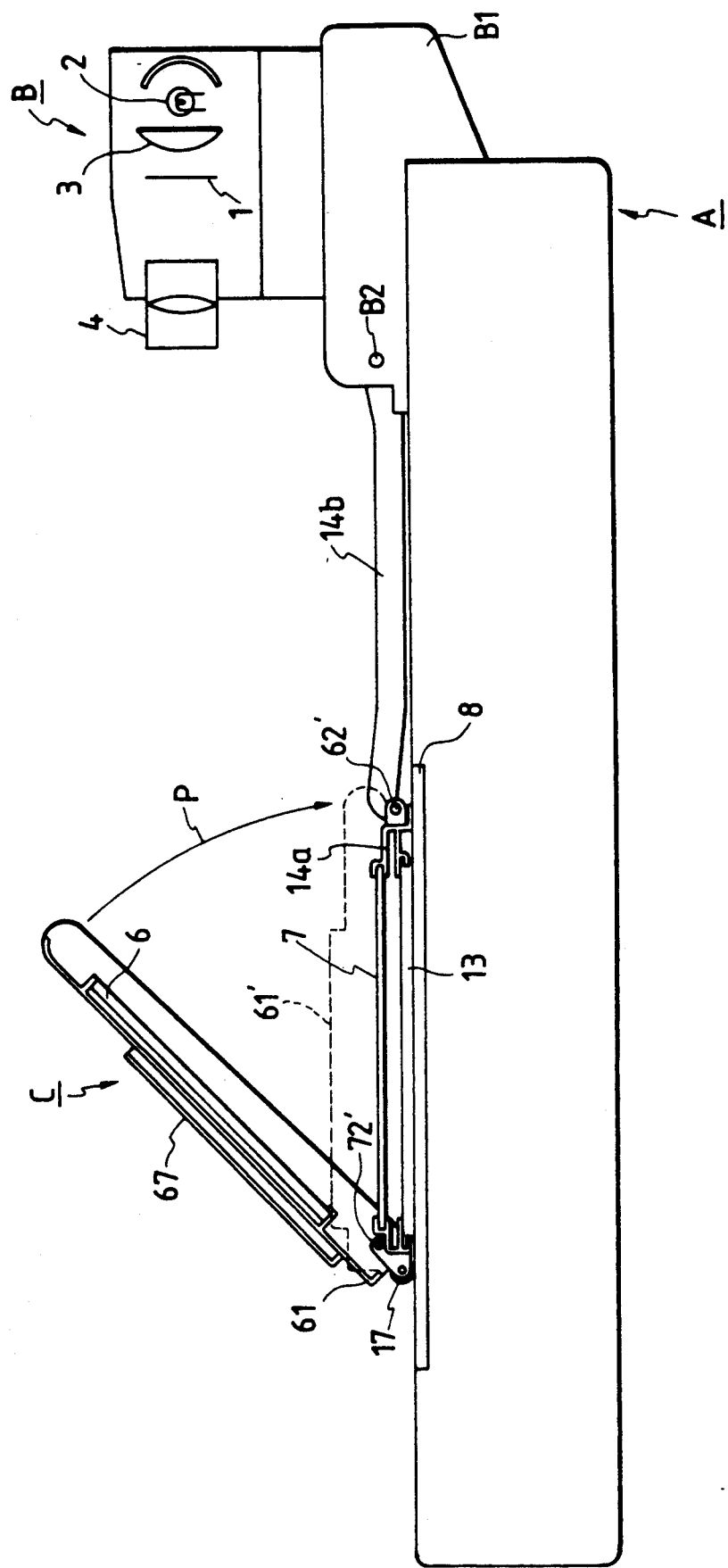
FIGS. 19 and 20 are cross-sectional views showing a sixth embodiment of the present invention.

The solid lines in FIG. 19 show the state of the transmissive original illuminating apparatus when used.

When the apparatus is to be contained, the mirror support member 61 is brought down in the direction of arrow P in FIG. 19 to a position indicated by broken line 61'. Subsequently, the second connecting member 14b is rotated relative to the shaft B2 in the direction of arrow Q in FIG. 20, and is moved to the contained position indicated by dot-and-dash lines C'''.

Figure 20:
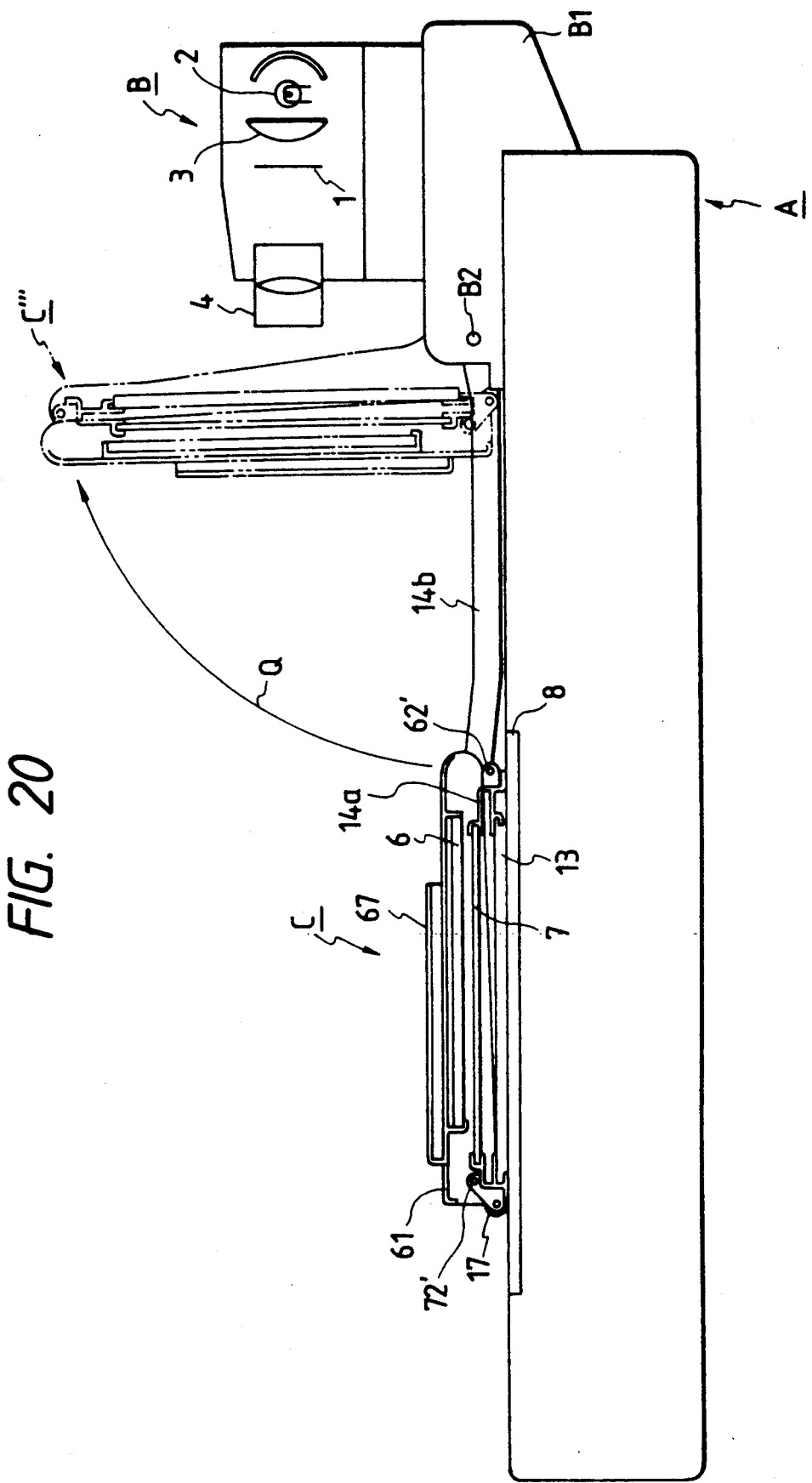
Figure 21:
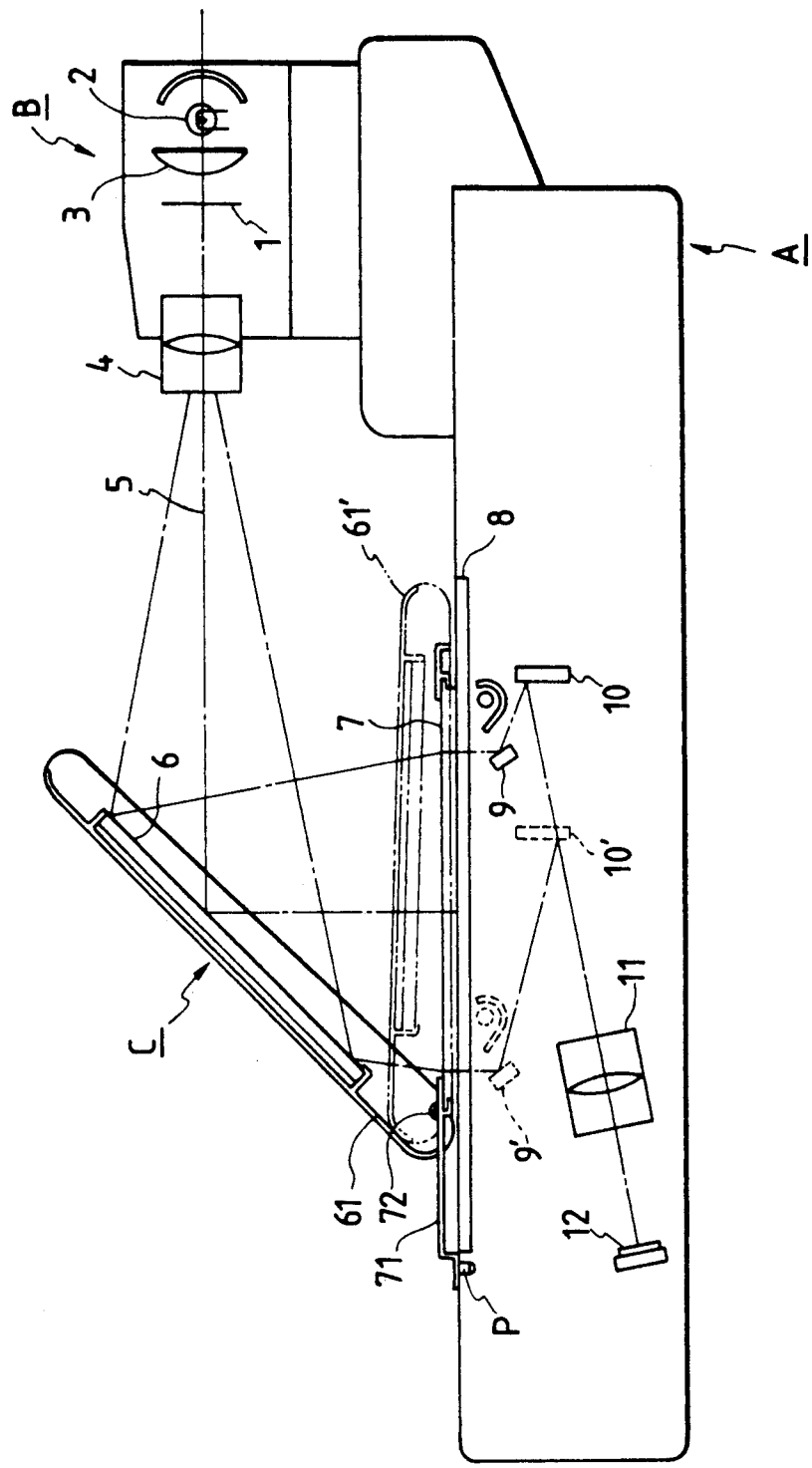
FIG. 21 is a cross-sectional view showing an original reading apparatus in which a projecting apparatus which is the background of the present invention is inserted.

Again in the embodiment shown in FIGS. 19 and 20, the mirror unit for deflecting the projected light beam toward the original supporting portion side can be moved between the used position and the contained position.

In the fifth and sixth embodiments described previously, by the mirror unit being brought to the contained position C' or C''', the transmissive original projecting apparatus is all retracted from the original supporting portion for supporting the original of the original reading apparatus thereon.

Here, the original reading apparatus having the original glass on which an original is placed has an original pressure plate, not shown, for pressing the original, and as described previously, when the transmissive original projecting apparatus is in its entirely retracted position, the original pressure plate becomes openable and closable on the original reading apparatus. Thus, reading of a reflective original placed on the original glass 8 can be accomplished more reliably.

In the aforedescribed embodiments, the transmissive original illuminating apparatus is mounted with respect to the original reading apparatus for reading images by a CCD, whereas the image reading apparatus to which the present invention can be applied is not restricted to that described above, but the present invention can be used in an apparatus having an original reading unit, such as an electrophotographic copying apparatus for forming the optical image from an original directly on a photosensitive member.

While some embodiments of the present invention have been described above, the present invention is not restricted to the above-described embodiments, but various modifications thereof are possible within the technical idea of the present invention.

We claim:

1. A transmissive original projecting apparatus having:
    an illuminating unit for illuminating a transmissive original and emitting a light beam conforming to the transmissive original, said illuminating unit having a light source and a lens;
    a parallel light projection lens for making the light emitted from said illuminating unit into parallel light; and
    connecting means for integrally connecting said illuminating unit and said parallel light projection lens together,
    said connecting means movably supporting said illuminating unit, said illuminating unit being movable to a first position for forming a projection optical path to said parallel light projection lens and a second position in which said illuminating unit is contained in said projection optical path side.

2. A transmissive original projecting apparatus according to claim 1, wherein said parallel light projection lens is movable relative to said connecting means, and movement of said illuminating unit is permitted after the movement of said parallel light projection lens.

3. A transmissive original projecting apparatus according to claim 1, wherein said illuminating unit and said parallel light projection lens are individually movable relative to said connecting means.

4. A transmissive original projecting apparatus according to claim 1, wherein said illuminating unit and said parallel light projection lens are connected together by an interlocking mechanism whereby the other of said illuminating unit and said parallel light projection lens is moved in response to the movement of one of them.

5. A transmissive original projecting apparatus according to claim 1, wherein said illuminating unit is rotatively movable relative to said connecting means.

6. A transmissive original projecting apparatus according to claim 1, wherein said parallel light projection lens is rotatively movable relative to said connecting means.

7. A transmissive original projecting apparatus according to claim 1, wherein said illuminating unit is parallel-movable relative to said connecting means.

8. A transmissive original projecting apparatus according to claim 1, wherein said parallel light projection lens is movable along a groove provided in said connecting means.

9. A transmissive original projecting apparatus according to claim 1, wherein when said transmissive original projecting apparatus is contained, said parallel light projection lens is positioned between said illuminating unit and said connecting means.

10. A transmissive original projecting apparatus according to claim 9, wherein said parallel light projection lens is a Fresnel lens formed of resin.

11. A transmissive original projecting apparatus according to claim 1, wherein said projecting apparatus is disposed on an original reading apparatus having an original supporting portion for supporting thereon an original to be read and wherein the distance between said illuminating unit and said original supporting portion onto which a projection light is projected is varied by movement of said illuminating unit.

12. A transmissive original projecting apparatus according to claim 11, wherein the distance between said illuminating unit and said original supporting portion becomes smaller by movement of said illuminating unit.

13. A transmissive original projecting apparatus according to claim 11, wherein said original reading apparatus reads the projected light from said transmissive original projecting apparatus.

14. A transmissive original projecting apparatus according to claim 11, wherein said projecting apparatus is removably mountable with respect to said original reading apparatus.

15. A transmissive original projecting apparatus carried on an original reading apparatus, having:
an illuminating unit for illuminating a transmissive original and emitting a light beam conforming to the transmissive original, said illuminating unit having a light source and a lens;
a parallel light projection lens for making the light emitted from said illuminating unit into a substantially parallel light;
connecting means for integrally connecting said illuminating unit and said parallel light projection lens together; and
a power source unit having a transducer and supplying electric power to said light source in said illuminating unit, said power source unit being provided in said connecting means.

16. A transmissive original projecting apparatus according to claim 15, wherein said connecting means has a vent hole for heat exhaust.

17. A transmissive original projecting apparatus according to claim 15, wherein said illuminating unit is positioned above said connecting means when it illuminates the transmissive original.

18. A transmissive original projecting apparatus according to claim 15, wherein said illuminating unit is rotatively movable relative to said connecting means.

19. A transmissive original projecting apparatus according to claim 15, wherein said projecting apparatus is disposed on an original reading apparatus having an original supporting portion for supporting thereon an original to be read and illuminating the original supported on said original supporting portion to thereby read the reflected light from the original and wherein said connecting means having said power source unit is disposed in contact with said original supporting portion.

20. A transmissive original projecting apparatus according to claim 19, wherein the distance between said illuminating unit and said original supporting portion becomes smaller by movement of said illuminating unit.

21. A transmissive original projecting apparatus according to claim 19, wherein said original reading apparatus reads the projected light from said transmissive original projecting apparatus.

22. A transmissive original projecting apparatus carried on an original reading apparatus having an original supporting portion for supporting an original thereon and reading a reflected light obtained by irradiating the original supported on said original supporting portion, said transmissive original projecting apparatus having:
an illuminating unit for illuminating a transmissive original and emitting a light beam conforming to the transmissive original;
deflecting means for deflecting the light emitted from said illuminating unit to the original supporting portion of said original reading apparatus; and
connecting means for connecting said illuminating unit and said deflecting means together, and connecting said deflecting means movably to a first position on said original supporting portion and a second position retracted from said original supporting portion.

23. A transmissive original projecting apparatus according to claim 22, further having an engagement member engaged with said deflecting means and said connecting means.

24. A transmissive original projecting apparatus according to claim 23, wherein said engagement member is a damper which absorbs the moving force of said deflecting means in at least one of said first position and said second position.

25. A transmissive original projecting apparatus according to claim 24, wherein said damper substantially absorbs the moving force of said deflecting means from said second position to said first position.

26. A transmissive original projecting apparatus according to claim 23, wherein said engagement member is a positioning member for positioning said deflecting means.

27. A transmissive original projecting apparatus according to claim 26, wherein said positioning member has a slot engaged with at least one of shafts provided in said connecting means and said deflecting means.

28. A transmissive original projecting apparatus according to claim 22, wherein said deflecting means has a roller which is in contact with said original supporting portion.

29. A transmissive original projecting apparatus according to claim 22, wherein said deflecting means is coupled to said connecting means through a rotational shaft, and when said deflecting means is in said second position, said roller is more toward said illuminating unit than a perpendicular passing through said rotational shaft.

30. A transmissive original projecting apparatus according to claim 22, wherein said deflecting means has a pocket for containing sheets therein.

31. A transmissive original projecting apparatus according to claim 22, further having a parallel light projection lens for making the light emitted from said illuminating unit substantially parallel and projecting it onto said original supporting portion.

32. A transmissive original projecting apparatus carried on an original reading apparatus having an original supporting portion for supporting an original thereon and reading reflected light obtained by irradiating the original supported on said original supporting portion, said transmissive original projecting apparatus having:
an illuminating unit for illuminating a transmissive original and emitting a light beam conforming to the transmissive original;
a parallel light projection lens for making the light emitted from said illuminating unit substantially parallel and projecting it onto said original supporting portion; and
connecting means for connecting said illuminating unit and said parallel light projection lens together and making said parallel light projection lens movable to a first position on said original supporting portion and a second position retracted from said original supporting portion;

33. A transmissive original projecting apparatus according to claim 32, further having deflecting means for deflecting the light emitted from said illuminating unit to said parallel light projection lens.

34. A transmissive original projecting apparatus carried on an original reading apparatus having an original supporting portion for supporting an original thereon and reading a reflected light obtained by irradiating the original supported on said original supporting portion, said transmissive original projecting apparatus having:
an illuminating unit for illuminating a transmissive original and emitting a light beam conforming to the transmissive original;
a projecting unit having deflecting means for deflecting the light emitted from said illuminating unit, and a Fresnel lens for making the light emitted from said illuminating unit substantially parallel, with
said deflecting means and said Fresnel lens being movable relative to each other to a first position in which they form a predetermined angle on said original supporting portion and a second position in which they are close to each other; and
connecting means for making said projecting unit which is in said second position wherein said deflecting means and said Fresnel lens are close to each other movable to a position retracted from said original supporting portion and close to said illuminating unit.

35. A transmissive original projecting apparatus according to claim 34, further having an original pressure plate capable of opening and closing said original supporting portion and wherein said original pressure plate can close said original supporting portion when said projecting unit is in a position close to said illuminating unit.

36. A transmissive original projecting apparatus according to claim 34, wherein said connecting means is coupled to said deflecting means of said projecting unit.

37. A transmissive original projecting apparatus according to claim 36, wherein when said transmissive original projecting apparatus is to be contained, said Fresnel lens is moved toward said deflecting means, and then said Fresnel lens and said deflecting means are moved toward said illuminating unit with said connecting means.

38. A transmissive original projecting apparatus according to claim 34, wherein said connecting means is coupled to said Fresnel lens of said projecting unit.

39. A transmissive original projecting apparatus according to claim 38, wherein when said transmissive original projecting apparatus is to be contained, said deflecting means is moved toward said Fresnel lens, and then said deflecting means and said Fresnel lens are moved toward said illuminating unit with said connecting means.

40. A transmissive original projecting apparatus according to claim 34, further having an engagement member engaged with said deflecting means and said connecting means.

41. A transmissive original projecting apparatus according to claim 40, wherein said engagement member is a damper which absorbs the moving force of said deflecting means in at least one of said first position and said second position.

42. A transmissive original projecting apparatus according to claim 41, wherein said damper substantially absorbs the moving force of said deflecting means from said second position to said first position.

43. A transmissive, original projecting apparatus according to claim 34, wherein said engagement member is a positioning member for positioning said deflecting means.

44. A transmissive original projecting apparatus according to claim 43, wherein said positioning member has a slot engaged with at least one of shafts provided in said connecting means and said deflecting means.

45. A transmissive original projecting apparatus according to claim 34, wherein said deflecting means is coupled to said connecting means through a rotational shaft, and when said deflecting means is in said second position, said roller is more toward said illuminating unit than a perpendicular passing through said rotational shaft.

46. A transmissive original projecting apparatus according to claim 34, wherein said deflecting means has a pocket for containing sheets therein.

47. A transmissive original projecting apparatus according to claim 34, wherein said Fresnel lens can be disposed in said original supporting portion, and space is provided between said disposed Fresnel lens and said original supporting portion.

48. A transmissive original projecting apparatus according to claim 34, wherein said projecting unit has an original keep member for pressing said original supporting portion.

49. A transmissive original projecting apparatus according to claim 48, wherein said original keep member is a transparent plate-like member.

50. A transmissive original projecting apparatus according to claim 48, wherein said Fresnel lens and said original keep member have one end thereof supported by said deflecting means and the other ends thereof supported by the same member through a rotatable shaft.

51. A transmissive original projecting apparatus according to claim 50, wherein said Fresnel lens and said original keep member are substantially parallel to each other.

52. A transmissive original projecting apparatus according to claim 51, wherein space is provided between said Fresnel lens and said original keep member.

53. A transmissive original projecting apparatus according to claim 50, wherein when said Fresnel lens and said deflecting means become close relative to each other, the distance between said Fresnel lens and said original keep member becomes smaller.

54. A transmissive original projecting apparatus according to claim 48, wherein said original keep member is movable and a sheet can be disposed on said original supporting portion.

55. A transmissive original projecting apparatus according to claim 54, wherein said sheet is a transmissive original.

56. A transmissive original projecting apparatus according to claim 54, wherein said sheet is a reference sheet for positioning the original.

57. A transmissive original projecting apparatus having:
an illuminating unit for illuminating a transmissive original and emitting a light beam conforming to the transmissive original;
deflecting means for deflecting the light emitted from said illuminating unit; and
connecting means for connecting said illuminating unit and said deflecting means together;
said connecting means forming an optical path along which the light transmitted through the transmissive original passes.

58. A transmissive original projecting apparatus according to claim 57, wherein said connecting means is positioned between said deflecting means and said illuminating unit.

59. A transmissive original projecting apparatus according to claim 57, wherein said connecting means has an opening through which the light transmitted through the transmissive original passes.

60. A transmissive original projecting apparatus according to claim 59, wherein said opening in said connecting means is substantially similar in shape to the deflecting portion of said deflecting means.

61. A transmissive original projecting apparatus according to claim 60, wherein said opening is smaller in area than said deflecting portion.

62. A transmissive original projecting apparatus according to claim 57, wherein said deflecting means has a pocket for containing sheets therein.

63. A transmissive original projecting apparatus having:
illuminating means for illuminating a transmissive original;
projecting means for directing light transmitted through the transmissive original;
an original reading apparatus having an original supporting portion for receiving the light transmitted through the transmissive original; and
connecting means for connecting said illuminating means and said projecting means together and movably supporting said illuminating unit between a first and second position, wherein
said transmissive original projecting apparatus is disposed on said original reading apparatus, and said original supporting portion supports an original to be read and irradiates the original supported thereon and also reads the reflected light from the original.

* * * * *

UNITED STATES PATENT AND TRADEMARK OFFICE
CERTIFICATE OF CORRECTION

PATENT NO. : 5,004,336

DATED : April 2, 1991

INVENTOR(S) : Yasutsugu Saijo, et al.

It is certified that error appears in the above-identified patent and that said Letters Patent is hereby corrected as shown below:

COLUMN 10:

Line 62, "together," should read --together, with--.

COLUMN 13:

Line 44, "portion;" should read --portion.--.

Signed and Sealed this

Thirteenth Day of October, 1992

Attest:

DOUGLAS B. COMER

Attesting Officer

Acting Commissioner of Patents and Trademarks